April 10, 1928.

W. D. STRATTON

HEATING APPARATUS

Filed Sept. 23, 1927   3 Sheets-Sheet 1

1,665,992

William D. Stratton INVENTOR

BY Victor J. Evans

ATTORNEY

WITNESS:

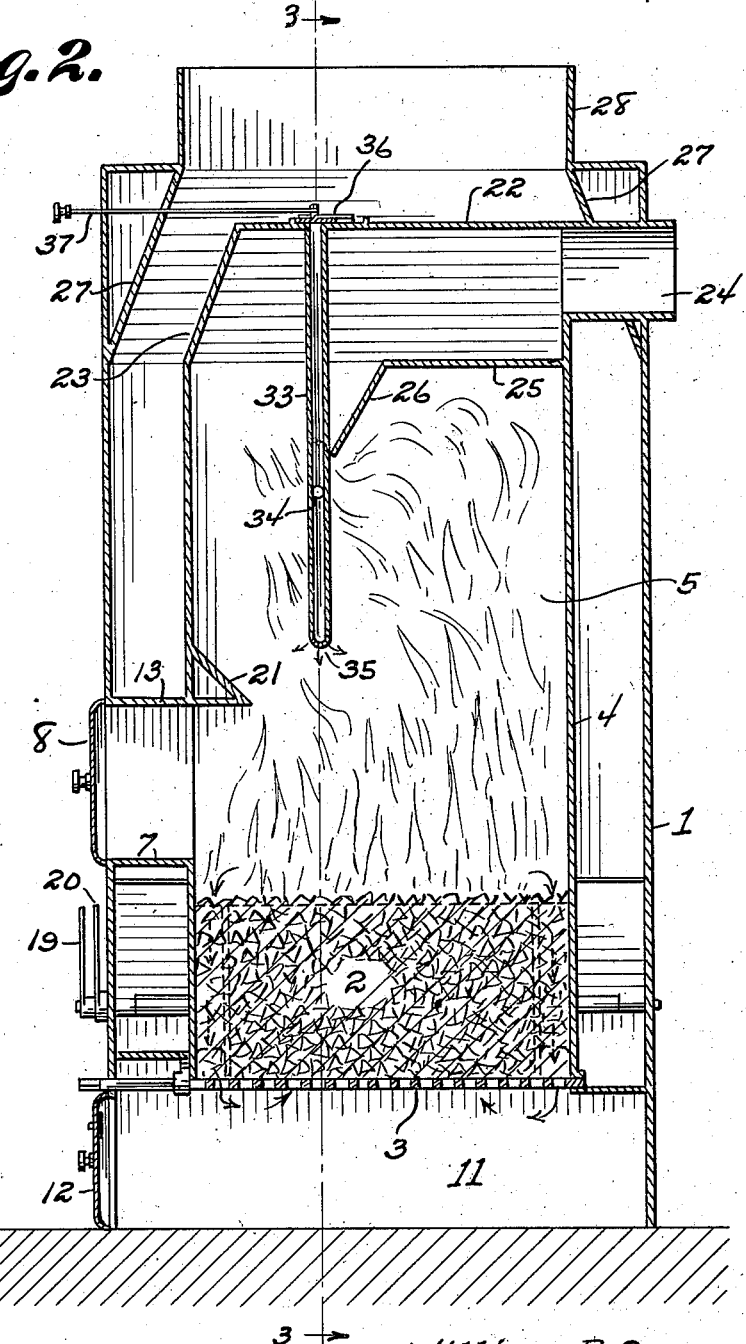

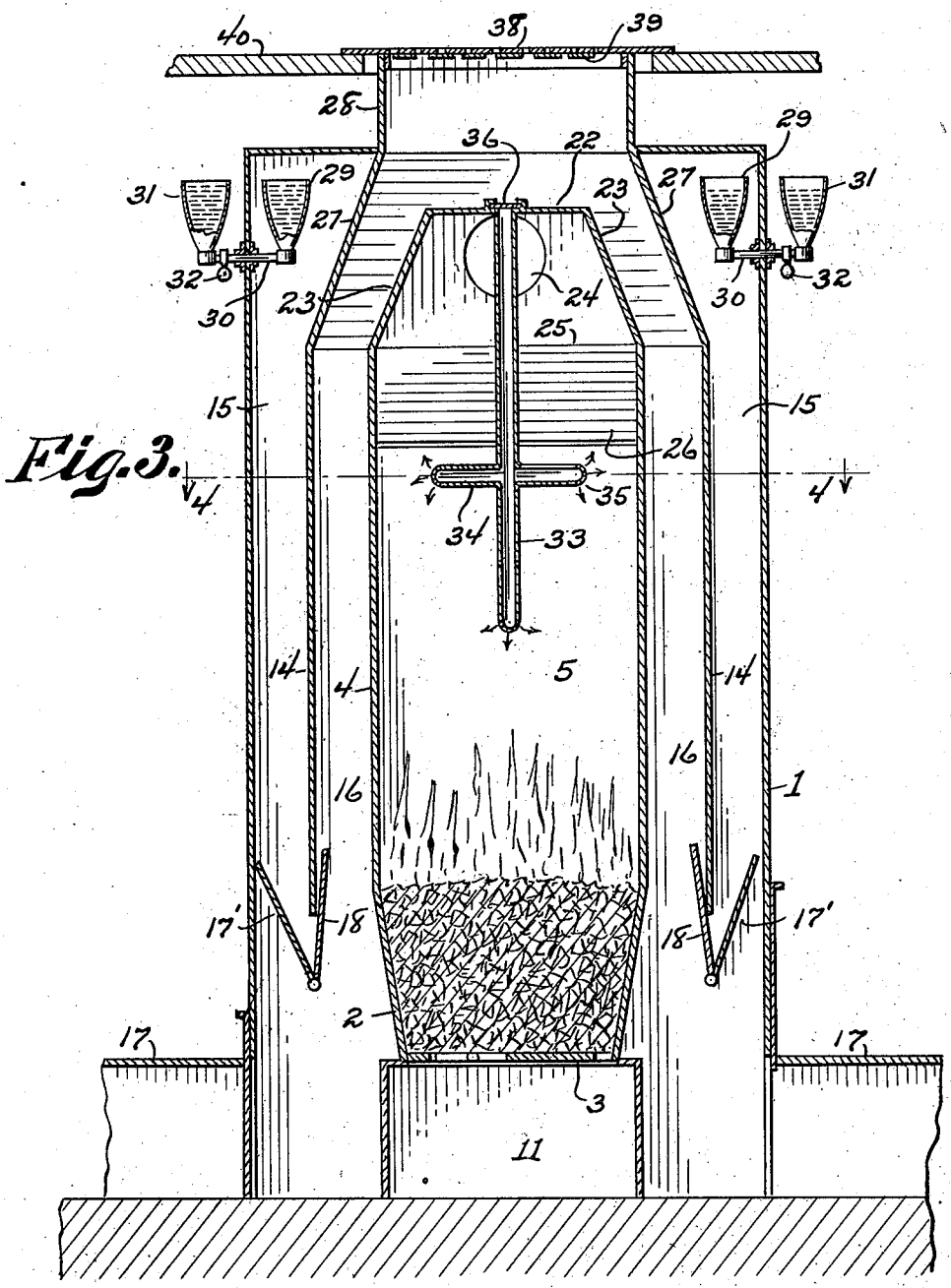

Patented Apr. 10, 1928.

1,665,992

UNITED STATES PATENT OFFICE.

WILLIAM D. STRATTON, OF FARWELL, MICHIGAN.

HEATING APPARATUS.

Application filed September 23, 1927. Serial No. 221,541.

My present invention has reference to a heating apparatus in the nature of a hot air furnace and one of my objects is the provision of a furnace of a simple but thoroughly efficient construction which insures complete combustion of the fuel to obtain the greatest amount of heat generated by such combustion and automatically distributing such heat and further wherein the greatest amount of heat may be obtained by a minimum amount of fuel.

Broadly my object is the provision of a hot air furnace in which the combustion takes place in three separate stages to overcome the force of cohesion, the change of fuel into carbon monoxide gas and then into carbon dioxide gas by means of a highly heated hot draft which is automatic in action and which is wholly arranged within the fire box together with addition of force to the projecting convection currents to insure the effective distribution of the heat in the room to which the heat is supplied.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 2 is a sectional view approximately on the line 2—2 of Figure 1.

Figure 3 is a sectional view approximately on the line 3—3 of Figure 2, the heat outlet end of the furnace being shown arranged in an opening in a floor of a building, and provided with a grating and a valve for controlling the heat passing through the grating.

Figure 1:
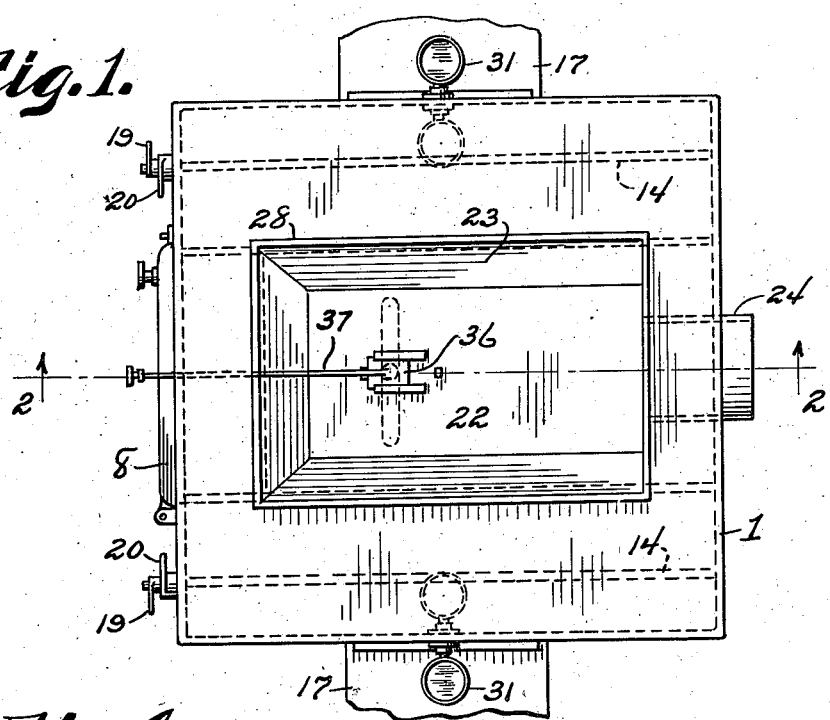
Figure 1 is a top plan view of a hot air furnace in accordance with this invention.
Figure 4:
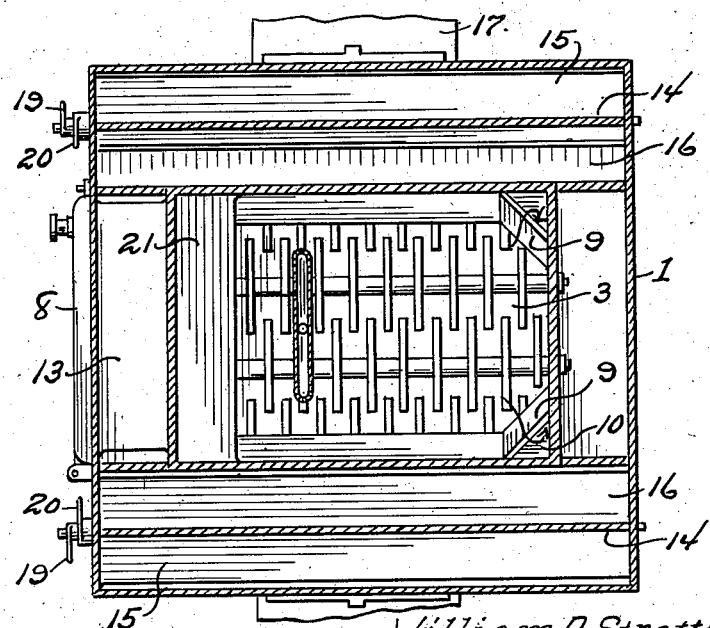
Figure 4 is a horizontal sectional view approximately on the line 4—4 of Figure 3.

In the showing of the drawings I have illustrated my improved hot air furnace of a one pipe type, but obviously the same may be provided with heat conductor pipes for directing heat to various rooms in a building. In this connection it may be well to state that I do not wish to be restricted to the general form and the details of construction and particular arrangement of parts of the furnace disclosed by the drawings as the same is merely one satisfactory embodiment of the improvement which is susceptible to such variations and changes as fairly fall within the scope of what I claim.

Referring now to the drawings in detail, the numeral 1 designates the casing of the furnace. In the showing of the drawings this casing is of square or rectangular formation. The fire pot of the furnace is indicated by the numeral 2, and the grate by the numeral 3. The fire pot is formed integrally with an inner shell 4 whose inner portion provides a combustion chamber 5. A rectangular casting 7 establishes a communication with the fire pot and the front of the furnace to permit of the insertion of fuel into the fire pot. This passage is noramlly closed by the usual door 8. The side walls of the fire pot are inclined toward the grate so that the fuel will gravitate onto such grate to prevent the clogging of the upper surface of the fuel and to insure a free passage of air through such fuel. The corners of the fire pot have angle ports 9 fixed therein to provide the said corners of the fire pot with passages 10 that communicate with the ash pit 11 having the usual door 12. Between the front and rear walls of the casing, and arranged centrally with respect to these walls there are other vertically disposed walls 14, providing outer compression chambers 15 and inner passages 16 for the conductive air currents. The outside air is let into the bottom of the casing and the sides of the fire pot and ash pit by conduits 17, respectively, and in the casing, below the walls 14 there are pivotally supported angularly disposed plates 17 and 18, respectively, which provides valves and which valves are controlled by operating handles 19 and 20, respectively. The valves are regulated to direct the air into the compression chambers 15 and into the passages 16.

The upper wall of the casting 7 is formed with an inwardly directed baffle 21 and the closed top 22 of the combustion chamber 5 has all, except one of its corners beveled, as at 23, the corner not so beveled being connected with a smoke outlet pipe 24. Below this pipe there is arranged in the combustion chamber a horizontal partition 25 that merges into a downwardly directed angle extension 26 which provides the upper and main baffle plate. The sides of the partitions 14, at the upper portions thereof and opposite the angle corners of the combustion chamber are arranged in the same angles as said corners and as indicated by the numeral 27 of the drawings. These angle walls 27 communicate with the heat outlet of the furnace and such heat outlet is surrounded by a flange 28.

In the widened upper portion of the compression chambers, provided by the angle walls 27 of the plates 14 there is arranged the inner water or vaporizing vessels 29 of the improvement. These vessels have their lower ends provided with pipes 30 that extend through the sides of the casing and which pipes have their outer ends connected with similar cups 31. The passage through each of the pipes 30 is controlled by a valve 32. Obviously by opening the valve and filling the outer cup 31 the water therefrom will flow through the pipe into the inner cup so that the heat in the furnace is thus maintained in a proper moistened condition and by observing the water in the outer cups 31 the water level in the inner cups may be readily determined.

Connected with the top plate 22 of the combustion chamber 5 there is the upper end of the hot blast pipe of the improvement. The main branch of this hot air blast is indicated by the numeral 33, but the said pipe is provided with lateral extensions 34. Thus the hot blast pipe is in the nature of a cross and the ends of both the main and angle branches of the said cross-shaped pipe are apertured, as at 35. The hot blast pipe 33 has its entrance controlled by a sliding valve 36, the said valve being operated by a rod 37 that is guided through one of the angle walls 27 and through the casing 1.

The openings 10 also provide hot blasts, and the flanged heat outlet 28 has arranged thereover the usual grating 38 that may be controlled by a valve or damper 39, the same, of course, being arranged on the floor 40 of a room into which the heat from the furnace is to be directed (see Fig. 3). With my improvement a complete combustion of fuel and the greatest amount of heat generated may be utilized in heating the room. The fire box construction with the hot blast openings from the bottom deliver a hot blast under the grate 3, insuring a complete combustion of the fuel in its first stage. The combustion, however, is not completed in the fire box. Hence there is no intense heat there to burn it out, as where the hot air blast is over the fuel. The gas and smoke are consumed at the lower vents or apertures of the hot blast pipe. As heat occurs the further unconserved gases are directed toward the rear and upwardly through the inwardly inclined or inverted reservoir at the top of the combustion chamber and will be consumed by the hot blasts. The fuel is subjected to three different hot blasts by the cross-shaped pipe 33. The hot blasts in the combustion chamber are near the conducting walls so as to utilize in radiation the greatest amount of heat. The hot blasts will draw the heated air from the outside and such air is superheated in its downward travel through the triple hot blast pipe or conductor and the arrangement of the said hot blast or conductor is such as to render the same most effective in the combustion of the fuel. The reservoir at the top of the combustion chamber for the smoke and unconserved gas retains such smoke and gas until they are superheated by the hot baffle plate 26 and this plate provides an important if not essential feature for the speedy combustion for such smoke and unconserved gas. The smoke outlet is lengthened by the baffle plate and by the wall or plate 25, thus insuring a greater absorption of the heat by the upper walls of the combustion chamber. The convective currents for the purpose of conveying heat to the room are very effective for the reason that such currents are confined to the narrow space between the outer wall of the fire box and the inner wall of the compression chamber where it radiates back and forth in its ascending and thus such currents are superheated as they are carried to the cooler air in the room. These superheated currents by close proximity to the heated walls of the furnace have their velocity accelerated, thus causing the same to effectively reach the most distant part of the room. The velocity of the currents is further increased by the opening of the hot blasts which creates a partial vacuum at the top of the heating apparatus. The angle walls of the combustion chamber, and the angle walls provided by the passages for the convective currents of heat are over the hot air blasts, thus compelling the intake to be from beneath the convective currents. The convective current is further accelerated by a force generated by the expansion and compression of air or air and vapor in the compression chambers and are thus automatically heated and expanded by heat which is usually lost through extended radiation. The inner walls of the compression chambers are unfinished steel or iron which admit a greater absorption and radiation of heat. Vapor is supplied by the water in the inner vapor cups and this vapor and the compressed air in the compression chambers effectively moistens the heat without danger of explosion, it being understood that the valves 32 are at all times opened so the pressure of the vapor is manifested at the point of least resistance, namely at the valve opposite the fire pot on either side of the furnace. The cool air cannot rise in the compression chamber nor can the hot air and vapor descend but the pressure is constant and the force exerted is also constant and is added to the convective current. The entire heating apparatus is automatic with the exception of the care of the drafts and the refilling of the vapor cups, it being understood that the doors 8 and 12 are provided with the usual openings controlled by the ordinary dampers.

The heating apparatus is simple in construction and economical in the use of fuel, and the construction and operation thereof will, it is thought, be perfectly understood and appreciated by those skilled in the art to which the invention relates when the foregoing description has been carefully read in connection with the accompanying drawings so that further detail description will not be required.

Having described the invention, I claim:

1. A hot air furnace having an ash pit therein, a fire box above the ash pit and a combustion chamber arising from the fire box, a baffle plate in the combustion chamber, and a second baffle plate in said chamber above and directed toward the first mentioned baffle plate, said chamber having a smoke outlet above the second named baffle plate, and said fire box having angle corner partitions therein providing hot air blast ducts between the combustion chamber and the ash pit.

2. A hot air furnace having an ash pit therein, a fire box above the ash pit and a combustion chamber arising from the fire box, a baffle plate in the combustion chamber, a second baffle plate in said chamber above and directed toward the first mentioned baffle plate, and said chamber having a smoke outlet above the second named baffle plate, said fire box having angle corner partitions therein providing hot air blast ducts between the combustion chamber and the ash pit, and a cross-shaped pipe arranged centrally to the combustion chamber having an open end secured to the top of the said chamber, and having its remaining ends closed and apertured.

3. A hot air furnace having an ash pit therein, a fire box above the ash pit and a combustion chamber arising from the fire box, a baffle plate in the combustion chamber, a second baffle plate in said chamber above and directed toward the first mentioned baffle plate, and said chamber having a smoke outlet above the second named baffle plate, said fire box having angle corner partitions therein providing hot air blast ducts between the combustion chamber and the ash pit, a cross-shaped pipe arranged centrally to the combustion chamber having an open end secured to the top of the said chamber, and having its remaining ends closed and apertured and a valve controlling the entrance to the cross-shaped pipe member.

4. A hot air furnace having an ash pit therein, a fire box above the ash pit and a combustion chamber arising from the fire box, a baffle plate in the combustion chamber, a second baffle plate in said chamber above and directed toward the first mentioned baffle plate, and said chamber having a smoke outlet above the second named baffle plate, said fire box having angle corner partitions therein providing hot air blast ducts between the combustion chamber and the ash pit, a cross-shaped pipe arranged centrally to the combustion chamber having an open end secured to the top of the said chamber, and having its remaining ends closed and apertured, a valve controlling the entrance to the cross-shaped pipe member, a convective chamber in the furnace opposite the combustion chamber and having a valved outlet and providing a compression chamber between the outer wall of the furnace and the said convective chamber and valves controlling the admission of outside air into the compression chamber and for directing such air into the convection chamber.

5. A hot air furnace having an ash pit therein, a fire box above the ash pit and a combustion chamber arising from the fire box, a baffle plate in the combustion chamber, a second baffle plate in said chamber above and directed toward the first mentioned baffle plate, and said chamber having a smoke outlet above the second named baffle plate, said fire box having angle corner partitions therein providing hot air blast ducts between the combustion chamber and the ash pit, a cross-shaped pipe arranged centrally to the combustion chamber having an open end secured to the top of the said chamber, and having its remaining ends closed and apertured, a valve controlling the entrance to the cross-shaped pipe member, a convective chamber in the furnace opposite the combustion chamber and having a valved outlet and providing a compression chamber between the outer wall of the furnace and the said convective chamber and valves controlling the admission of outside air into the compression chamber and for directing such air into the convection chamber and a vaporizer in the compression chamber.

6. A hot air furnace having an ash pit therein, a fire box above the ash pit and a combustion chamber arising from the fire box, a baffle plate in the combustion chamber, a second baffle plate in said chamber above and directed toward the first mentioned baffle plate, and said chamber having a smoke outlet above the second named baffle plate, and said fire box having angle corner partitions therein providing hot air blast ducts between the combustion chamber and the ash pit, a cross-shaped pipe arranged centrally to the combustion chamber having an open end secured to the top of the said chamber, and having its remaining ends closed and apertured, and a valve controlling the entrance to the cross-shaped pipe member, a convective chamber in the furnace opposite the combustion chamber and having a valved outlet and providing a compression chamber between the outer wall of the furnace and the said convective chamber and valves controlling the admission of outside heated air into the compression chamber and for directing such air into the convective chamber, and a vaporizer in the compression chamber, said vaporizer including inner and outer bowls and a valved pipe connecting said bowls.

7. A hot air furnace including a casing having air ducts entering the bottom thereof, valves controlling the admission of air through the ducts, an ash pit in the casing having a fire box thereover and a combustion chamber extending through the fire box, partitions in the fire box establishing hot blast ducts between the combustion chamber and the ash pit, a lower baffle plate in the combustion chamber, an upper baffle plate in the combustion chamber directed toward the lower baffle plate, a partition connecting the last mentioned baffle plate with the sides and one of the ends of the combustion chamber, said combustion chamber, having a smoke outlet above said partition plate, a hot blast pipe of cross-formation having an open end connected to the top of the combustion chamber and having its remaining ends rounded and apertured, a valve controlling the open end of the pipe, an inner convection chamber in the casing surrounding the combustion chamber and establishing an outer compression chamber, a valved outlet for the convection chamber, and angularly arranged valve plates below the outer wall of the convection chamber swingable into the compression chamber and likewise swingable into the convection chamber.

8. A hot air furnace which comprises a casing, having a fire box therein, a combustion chamber extending from the fire box and having a valve controlled smoke outlet, an inner convection chamber in the casing surrounding the combustion chamber and establishing a compression chamber between the casing and said convection chamber, a valved outlet for the convection chamber, angularly arranged valve plates at the lower wall of the convection chamber swingable into this chamber and into the compression chamber and valve controlled means for supplying outside air and directing the same through the compression chamber to add to the propulsive force of the ascending convective air currents through the convection chamber and likewise supplying cool air to the compression chamber.

In testimony whereof I affix my signature

WILLIAM D. STRATTON